(12) United States Patent
Araújo et al.

(10) Patent No.: US 10,999,423 B2
(45) Date of Patent: May 4, 2021

(54) MESSAGE HANDLING IN A TERMINAL DEVICE

(71) Applicant: Telefonaktiebolaget LM Ericsson (publ), Stockholm (SE)

(72) Inventors: José Araújo, Stockholm (SE); Zeid Al-Husseiny, Stockholm (SE); Lars Andersson, Solna (SE); Soma Tayamon, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/623,681

(22) PCT Filed: Jun. 28, 2017

(86) PCT No.: PCT/EP2017/066034
§ 371 (c)(1),
(2) Date: Dec. 17, 2019

(87) PCT Pub. No.: WO2019/001706
PCT Pub. Date: Jan. 3, 2019

(65) Prior Publication Data
US 2020/0195770 A1    Jun. 18, 2020

(51) Int. Cl.
*H04W 4/23*    (2018.01)
*H04M 1/7243*    (2021.01)
*H04W 4/12*    (2009.01)

(52) U.S. Cl.
CPC ........... *H04M 1/7243* (2021.01); *H04W 4/12* (2013.01)

(58) Field of Classification Search
CPC ........ H04H 60/74; H04H 20/24; H04H 20/26; H04H 60/82; H04N 21/4622; H04N 21/44204; H04N 21/466
See application file for complete search history.

(56) References Cited

U.S. PATENT DOCUMENTS

| | | | |
|---|---|---|---|
| 2006/0153351 A1* | 7/2006 | Hartung | H04M 15/77 379/114.03 |
| 2008/0176562 A1* | 7/2008 | Howard | H04L 51/04 455/435.1 |

(Continued)

FOREIGN PATENT DOCUMENTS

| | | |
|---|---|---|
| KR | 101705598 B1 | 2/2017 |
| WO | 2014066257 A2 | 5/2014 |

OTHER PUBLICATIONS

International Search Report and Written Opinion of the International Searching Authority for PCT International Application No. PCT/EP2017/066034 dated Oct. 17, 2017.

(Continued)

*Primary Examiner* — Dai Phuong
(74) *Attorney, Agent, or Firm* — Sage Patent Group (57) ABSTRACT

There is provided mechanisms for message handling in a terminal device. A method is performed by the terminal device. The method comprises receiving a message comprising user content from a network controller. The method comprises providing a notification of the message to a user interface of the terminal device. The method comprises receiving feedback from the user interface. The feedback indicates which amount of the user content that has been played out at the user interface. The method comprises performing an action on the message according to the amount of the user content that has been played out.

33 Claims, 4 Drawing Sheets

(56) References Cited

U.S. PATENT DOCUMENTS

| | | | |
|---|---|---|---|
| 2010/0280897 A1 | 11/2010 | Elia et al. | |
| 2012/0328267 A1* | 12/2012 | Panje | H04N 5/76 386/326 |
| 2013/0326577 A1 | 12/2013 | Bahnck | |
| 2014/0122258 A1* | 5/2014 | Sharp | G06Q 30/0277 705/14.73 |
| 2014/0148110 A1* | 5/2014 | Ingrassia | H04H 60/74 455/150.1 |
| 2014/0235217 A1* | 8/2014 | Rosenberg | G06Q 20/102 455/418 |
| 2014/0325674 A1 | 10/2014 | Lee | |
| 2016/0189038 A1* | 6/2016 | Sanjay | G06N 5/04 706/55 |
| 2018/0276717 A1* | 9/2018 | Langston | G06Q 30/0276 |
| 2019/0124404 A1* | 4/2019 | Mitsuji | H04N 21/63345 |
| 2020/0159639 A1* | 5/2020 | Benari | G06F 3/167 |
| 2020/0314054 A1* | 10/2020 | Collins | H04L 51/02 |

OTHER PUBLICATIONS

Anonymous, "7 (8) Online Services to Send Messages that Auto Delete after Reading," Raymond.CC, Dec. 14, 2012, Retrieved from the Internet: URL:https://web.archive.org/web/20121214053229/http://www.raymond.cc:80/blog/message-or-text-that-automatic-deletes-after-viewing/ [retrieved on Oct. 5, 2017], pp. 1-6.

Kincaid, "YouTube Officially Launches Ads You Can Skip," TechCrunch, Dec. 1, 2010, Retrieved from the Internet: URL:https://techcrunch.com/2010/12/01/youtube-officially-launches-ads-you-can-skip/ [retrieved on Oct. 5, 2017], pp. 1-8.

* cited by examiner

MESSAGE HANDLING IN A TERMINAL DEVICE

CROSS REFERENCE TO RELATED APPLICATION

This application is a 35 U.S.C. § 371 national stage application of PCT International Application No. PCT/EP2017/066034, filed on Jun. 28, 2017, the disclosure and content of which is incorporated herein by reference in its entirety.

TECHNICAL FIELD

Embodiments presented herein relate to methods, a terminal device, a network controller, a computer program, and a computer program product for message handling in the terminal device.

BACKGROUND

In general terms, haptic communication aims at recreating the sense of touch by applying forces, vibrations, or motions to the user. Such stimulation can be used to assist in the creation of virtual objects in a computer simulation, to control such virtual objects, to create more intuitive user interfaces, to improve media consumption experience, and to enhance the remote control of machines and devices.

Systems that combine haptic and visual information using haptic user interface devices (such as joysticks held by the user, haptic touchscreens, or gloves worn by the user) and visual user interface devices (such as screens viewed by the user or head mounted displays worn by the user) have been proposed.

Further, systems that could combine haptic information with visual information as well as audio information and text information could be integrated in user devices, such as terminal devices. Each type of user content (haptic information, visual information, audio information, and text information) will hereinafter be referred to a modality of user content (or just modality for short).

Several mechanisms for providing haptic feedback to terminal devices exist and consider the interaction of the user with the user interface or by providing haptic feedback according to audio or video content being displayed by the terminal device. In other scenarios, two users, each using a respective terminal device with a haptic device, may transmit the sense of touch to each other by interacting with the display of the terminal device in real-time. Each user receives haptic feedback with respect to the haptic properties (e.g. texture, friction, stiffness) of the user interface, image, object or the other user's finger on a specific location if the terminal device is capable of tracking the user's finger position.

Despite the advancement of capabilities of terminal devices to play out user content, it could still be so that a particular terminal device only is capable of playing out user content of less than all its modalities. It could thus be cumbersome to handle user content of different modalities, which might be necessary in order to know what type of user content (in terms of modality) to deliver to a particular terminal device, and to know whether or not the user content has been properly played out at the terminal device.

Hence, there is still a need for enabling improved handling of messages in terminal devices.

SUMMARY

An object of embodiments herein is to enable efficient handling of messages in terminal devices.

According to a first aspect there is presented a method for message handling in a terminal device. The method is performed by the terminal device. The method comprises receiving a message comprising user content from a network controller. The method comprises providing a notification of the message to a user interface of the terminal device. The method comprises receiving feedback from the user interface. The feedback indicates which amount of the user content that has been played out at the user interface. The method comprises perform an action on the message according to the amount of the user content that has been played out.

According to a second aspect there is presented a terminal device for message handling in the terminal device. The terminal device comprises processing circuitry. The processing circuitry is configured to cause the terminal device to receive a message comprising user content from a network controller. The processing circuitry is configured to cause the terminal device to provide a notification of the message to a user interface of the terminal device. The processing circuitry is configured to cause the terminal device to receive feedback from the user interface. The feedback indicates which amount of the user content that has been played out at the user interface. The processing circuitry is configured to cause the terminal device to perform an action on the message according to the amount of the user content that has been played out.

According to a third aspect there is presented a terminal device for message handling in the terminal device. The terminal device comprises processing circuitry and a storage medium. The storage medium stores instructions that, when executed by the processing circuitry, cause the terminal device to perform operations, or steps. The operations, or steps, cause the terminal device to receive a message comprising user content from a network controller. The operations, or steps, cause the terminal device to provide a notification of the message to a user interface of the terminal device. The operations, or steps, cause the terminal device to receive feedback from the user interface. The feedback indicates which amount of the user content that has been played out at the user interface. The operations, or steps, cause the terminal device to perform an action on the message according to the amount of the user content that has been played out.

According to a fourth aspect there is presented a terminal device for message handling in the terminal device. The terminal device comprises a receive module configured to receive a message comprising user content from a network controller. The terminal device comprises a provide module configured to provide a notification of the message to a user interface of the terminal device. The terminal device comprises a receive module configured to receive feedback from the user interface. The feedback indicates which amount of the user content that has been played out at the user interface. The terminal device comprises a modify module configured to perform an action on the message according to the amount of the user content that has been played out.

According to a fifth aspect there is presented a computer program for message handling in a terminal device, the computer program comprising computer program code which, when run on processing circuitry of the terminal device, causes the terminal device to perform a method according to the first aspect.

According to a sixth aspect there is presented a method for message handling in terminal devices. The method is performed by a network controller. The method comprises sending a message comprising user content to at least two terminal devices. The method comprises receiving, from at least one of the terminal devices having received the message, an indication of the amount of the user content that has been played out at this at least one of the terminal devices. The method comprises sending, to any remaining of the terminal devices having received the message, an indication of the amount of the user content that has been played out at this at least one of the terminal devices.

According to a seventh aspect there is presented a network controller for message handling in terminal devices. The network controller comprises processing circuitry. The processing circuitry is configured to cause the network controller to send a message comprising user content to at least two terminal devices. The processing circuitry is configured to cause the network controller to receive, from at least one of the terminal devices having received the message, an indication of the amount of the user content that has been played out at this at least one of the terminal devices. The processing circuitry is configured to cause the network controller to send, to any remaining of the terminal devices having received the message, an indication of the amount of the user content that has been played out at this at least one of the terminal devices.

According to an eighth aspect there is presented a network controller for message handling in terminal devices. The network controller comprises processing circuitry and a storage medium. The storage medium stores instructions that, when executed by the processing circuitry, cause the network controller to perform operations, or steps. The operations, or steps, cause the network controller to send a message comprising user content to at least two terminal devices. The operations, or steps, cause the network controller to receive, from at least one of the terminal devices having received the message, an indication of the amount of the user content that has been played out at this at least one of the terminal devices. The operations, or steps, cause the network controller to send, to any remaining of the terminal devices having received the message, an indication of the amount of the user content that has been played out at this at least one of the terminal devices.

According to a ninth aspect there is presented a network controller for message handling in terminal devices. The network controller comprises a send module configured to send a message comprising user content to at least two terminal devices. The network controller comprises a receive module configured to receive, from at least one of the terminal devices having received the message, an indication of the amount of the user content that has been played out at this at least one of the terminal devices. The network controller comprises a send module configured to send, to any remaining of the terminal devices having received the message, an indication of the amount of the user content that has been played out at this at least one of the terminal devices.

According to a tenth aspect there is presented a computer program for message handling in a terminal device, the computer program comprising computer program code which, when run on processing circuitry of a network controller, causes the network controller 300 to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these terminal devices, these network controllers, and these computer programs enable efficient handling of messages in the terminal device.

Advantageously these methods, these terminal devices, these network controllers, and these computer programs enable messages with user content modalities, such as haptic user content, to be received and handled by the terminal device in a suitable manner.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
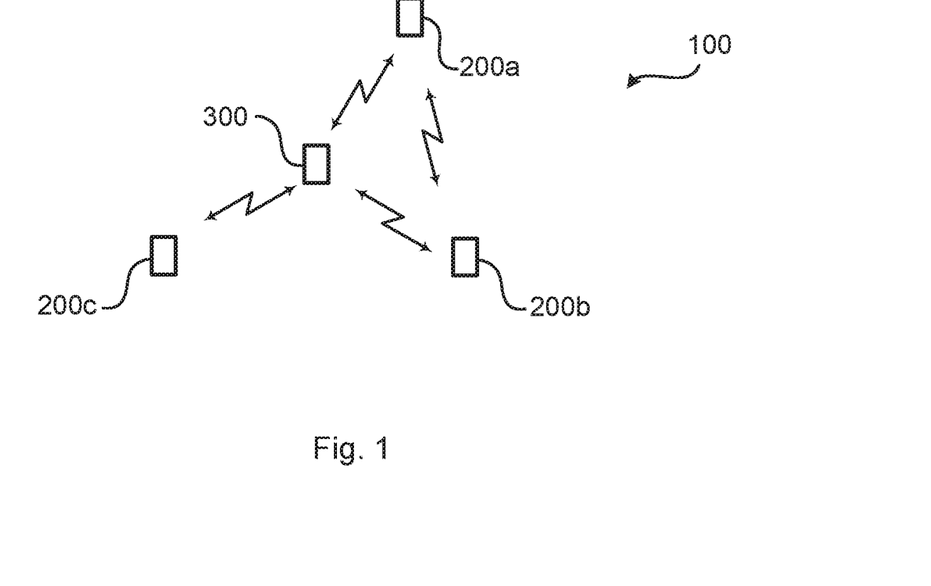
FIG. 1 is a schematic diagram illustrating a communication network according to embodiments.

FIG. 1 is a schematic diagram illustrating a communications network 100 where embodiments presented herein can be applied. The communications network 100 comprises terminal devices 200a, 200b, 200c, and a network controller 300. In some aspects the communications network 100 is a wireless communications network, such as a cellular communications network. As appreciated by the skilled person the communications network 100 illustrated in FIG. 1 is a simplified version of a real-world communications network comprising a plurality of network nodes, such as radio access network nodes in a radio access network part, core network nodes in a core network part, and user content servers in a service network part. However, the simplification has been made without loss of generality and in order to not obstruct the embodiments as disclosed herein.

Each terminal device 200a, 200b, 200c could be a portable wireless device, mobile station, mobile phone, handset, wireless local loop phone, user equipment (UE), smartphone, smartwatch, head mounted display, laptop computer, tablet computer, desktop computer, network equipped vehicle, etc.

At least one of the terminal devices 200a, 200b, 200c (hereinafter at least terminal device 200a) is assumed to be configured according to the following. The terminal device comprises means to receive messages with haptic, visual and/or audio user content. The terminal device comprises means to render user content for a user to consume (feel, see, and/or hear the user content) with haptic, visual, and/or audio feedback, via haptic, visual and/or audio actuators.

The user content could have a required minimum consumption level for each modality. In other words, in order for the user content of each modality to be considered as played out, at least some part (corresponding to the required minimum consumption level) must be played out. The minimum consumption level may depend on the actuator type. As an example, the minimum consumption level for haptic, visual and audio modalities for a message M is denoted $Lr(M)=[H, V, A]$, where H represents haptic level, V represents visual level and A represents audio level, are a tuple, and each value H, V and A take a value in the range between [0, 1] depending on its consumption level. A required minimum consumption level for visual user content could be defined in terms of how long (in terms of seconds) the visual user content has been displayed on a visual user interface and/or how large portion (in terms or percentage) of the visual user content has ben displayed on the visual user interface in case the visual user interface is not capable of rendering the complete visual user content at one time. A required minimum consumption level for audio user content could be defined in terms of how long (in terms of seconds) the audio user content has ben displayed on a audio user interface and/or at what audio quality the audio user content has been played out, and so on. Examples and more details on the consumption level will be provided below.

The terminal device comprises means configured to perform methods as hereinafter will be disclosed.

It is envisioned that one and the same user may have access to several terminal devices which are capable of playing out various modalities of user content.

As disclosed above, it could be cumbersome to handle user content of different modalities.

The embodiments disclosed herein therefore relate to mechanisms for message handling in a terminal device 200a. In order to obtain such mechanisms there is provided a terminal device 200a, a method performed by the terminal device 200a, a computer program product comprising code, for example in the form of a computer program, that when run on processing circuitry of the terminal device 200a, causes the terminal device 200a to perform the method. In order to obtain such mechanisms there is further provided a network controller 300, a method performed by the network controller 300, and a computer program product comprising code, for example in the form of a computer program, that when run on processing circuitry of the network controller 300, causes the network controller 300 to perform the method.

Figure 2:
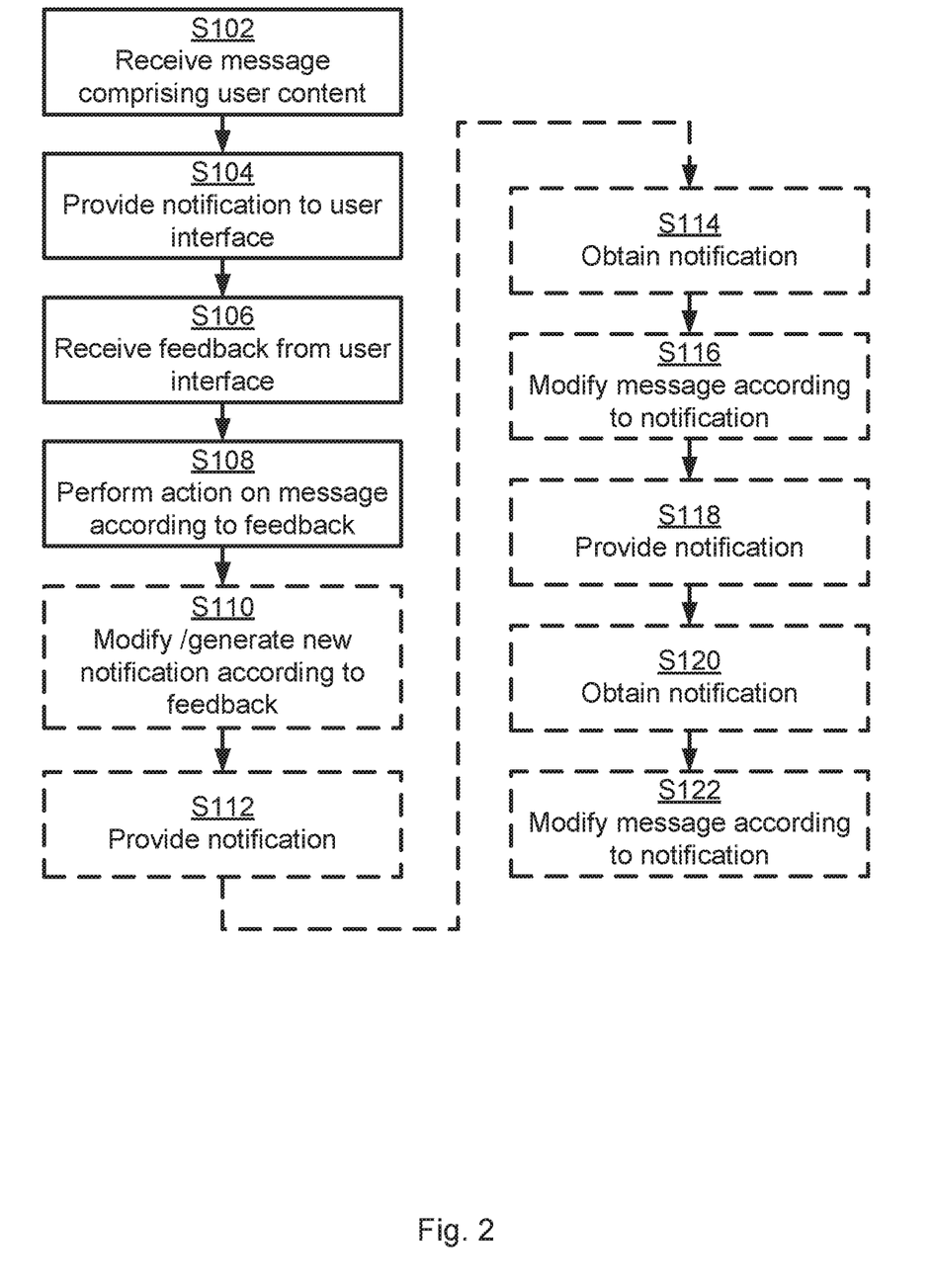
FIGS. 2, and 3 are flowcharts of methods according to embodiments.
Figure 3:
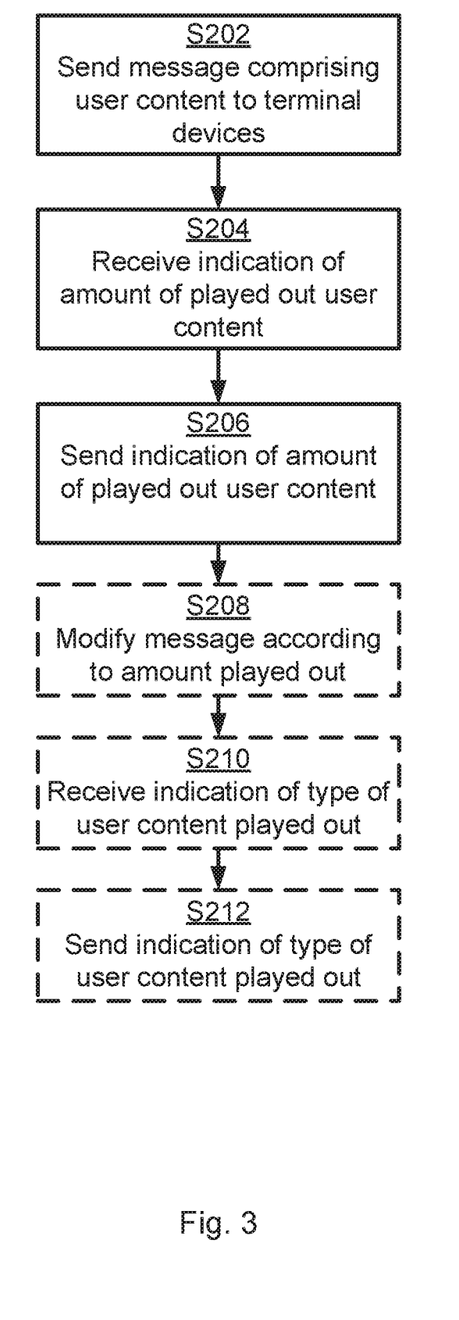

FIG. 2 is a flowchart illustrating embodiments of methods for message handling in a terminal device 200a as performed by the terminal device 200a. FIG. 3 is a flowchart illustrating embodiments of methods for message handling in a terminal device 200a as performed by the network controller 300. The methods are advantageously provided as computer programs 820a, 820b.

Reference is now made to FIG. 2 illustrating a method for message handling in a terminal device 200a as performed by the terminal device 200a according to an embodiment.

It is assumed that one of terminal devices 200b, 200c, or another terminal device, or server with user content, transmits a message to the terminal device 200a. The message is forwarded to terminal device 200a by the network controller 300. Hence, the terminal device 200a is configured to perform step S102:

S102: The terminal device 200a receives a message. The message comprises user content. The message is received from the network controller 300.

The user content is to be played out at a user interface of the terminal device 200a in order for the user content to be consumed by a user of the terminal device 200a. The user therefore has to be notified of the message. Therefore, the terminal device 200a is configured to perform step S104:

S104: The terminal device 200a provides a notification of the message to a user interface of the terminal device 200a.

This gives the user the opportunity to consume the user content by interacting with the user interface. Particularly, the user could request the user interface to play out the user content. The user interface therefore indicates how much of the user content has been played out. Hence, the terminal device 200a is configured to perform step S106:

S106: The terminal device 200a receives feedback from the user interface. The feedback indicates which amount of the user content that has been played out at the user interface.

It could be that no user content has been played out and thus that the amount of user content that has been played out is zero. An action is then performed on the message. Particularly, the terminal device 200a is configured to perform step S108:

S108: The terminal device 200a performs an action on the message according to the amount of the user content that has been played out.

Embodiments relating to further details of message handling in a terminal device 200a as performed by the terminal device 200a will now be disclosed.

There could be different types of actions performed on the message in step S108. According to a first embodiment the action involves determining to keep the message intact. This action could be performed if the amount of user content that has been played out is zero or if less than a required minimum consumption level of the user content has been played out. According to a second embodiment the action involves determining that the message is to be modified. This action could be performed if some, but not all, user content has been played out. According to a third embodiment the action involves determining that the message is to be deleted from the terminal device 200a. This action could be performed if all user content has been played out or if the amount of user content that has been played out is zero and the terminal device 200a is incapable of playing out the user content. In some aspects this could cause the terminal device 200a to request a new message with user content from the network controller 300, e.g. where the terminal device 200a specifies what type of user content the terminal device 200a is capable of playing out.

As disclosed above, there could be different modalities of the user content. Particularly, according to an embodiment the message comprises user content of at least two types, where the at least two types are selected from a group comprising text content, audio content, haptic content, and olfactory content. In further aspects, in scenarios where a message comprises user content of at least two types and the user interface only is capable of playing out user content of less than all the at least two types, only the user content of the type, or types, that the user interface only capable of playing out is provided to the terminal device 200a from the network controller 300.

There could be different ways to determine the amount of the user content that has been played out at the user interface. In general terms, the term amount has used herein could relate to the quantity of user content consumed (such a duration) and/or quality (such as how well the user content was consumed). In some aspects the amount relates to quantity. For example, in terms of audio content, the amount could relate to how many seconds of the audio content that has been played out. For example, in terms of visual content, the amount could relate to how much of the visual content that was played out and what part of the visual content was actually viewed by the user during the play out of the visual content. In some aspects the amount relates to quality. For example, in terms of audio content, the amount could relate to at what bitrate or audio quality the audio content was played out. For example, in terms of visual content, the amount could relate to at what resolution the visual content was played out. For example, in terms of haptic content, the amount could relate to with how many actuators the haptic content was played out and how many modalities of the haptic content was consumed by the user.

In some aspects, a reception of a message with haptic and at least visual and/or audio user content is performed by the terminal device. The message is stored temporarily or permanently at the terminal device.

In some aspects, the user content is kept in the terminal device until the consumption level has reached above a defined threshold level. Particularly, according to an embodiment the user content is stored in the terminal device 200a only until the amount of the user content that has been played out at the user interface is above a threshold value. According to another embodiment the user content is stored in the terminal device 200a only if the user interface is capable of playing out the user content.

In some aspects, a visual and/or audio notification of the reception of the message is provided to the user interface. Particularly, according to an embodiment the notification indicates which type of user content is comprised in the message. Thus, in some aspects, the notification specifically shows that haptic user content is to be delivered in the message.

In other aspects, the notification is only displayed if the terminal device has the required haptic actuators for delivering the message. Particularly, according to an embodiment the notification is removed from the user interface if the terminal device 200a determines that it is incapable of playing out any remaining user content of the message. According to another embodiment the notification is removed from the user interface if the user interface is incapable of playing out any remaining user content of the message. The terminal device 200a might then either notify the network controller 300 of what user content could be played out so that a new notification can be generated at the network controller 300, or generate a new notification at the terminal device 200a.

The notification might only be displayed if the terminal device has the haptic actuators which allow for a consumption level to be above a certain threshold (such levels and examples are detailed below). That is, according to an embodiment the user content is associated with a required level of consumption, and the notification is removed from the user interface of the terminal device 200a if the terminal device 200a is incapable of playing out the user content to an amount being less than the required level of consumption.

Further, if applicable, a notification stating that the terminal device does not have the required actuators to deliver the message could be displayed. Particularly, according to an embodiment the notification, when the user interface is incapable of playing out the user content, indicates that the user interface is incapable of playing out any remaining user content of the message.

In some aspects, the consumption level for each modality is inferred and set in an interval, such as the interval [0, 1]. As disclosed above, the haptic, visual and audio levels of the user content could be denoted $L(M)=[H, V, A]$. The consumption level may be affected by, for example, a modality not being able to be delivered (e.g. haptic feedback is disabled in the terminal device, thus $H=0$), not being correctly delivered (e.g. the user cannot correctly see a visual message, thus $V=0$), or the message reading is interrupted before the user visual content has been fully consumed (thus, $V<1$). In another example, the required haptic feedback actuation is not present at the terminal device, and so the haptic consumption level is set as $H=0$. In another example, only a partial haptic feedback is performed due to a lack or limitation of the haptic feedback actuation, and thus $H<1$.

When the user content is text the user interface could be a visual user interface and the feedback indicates how much of the text that has been displayed on the visual user interface. When the user content is audio the user interface could be an audio user interface and the feedback indicates how much of the audio that has been played out by the audio user interface. When the user content is haptic the user interface could comprise motion sensors and the feedback indicates how much the motion sensors have been activated when playing out the message. For example, there could be motion sensors for position, speed and acceleration, force sensors could be applied to measure applied pressure by the user's finger, or the contact profile from the user's finger into the surface could be measured in order to determine if a rendered texture has been felt (and thus the user content consumed). When the user content is olfactory the user interface could comprise an olfactory sensor and the feedback indicates how much the olfactory sensor has been activated when playing out the message.

In further detail, inference of the consumption level for the visual modality may be performed via user eye tracking, monitoring of the terminal device user interface events (e.g. interruptions, deactivation of message text too quickly after it is displayed) and inferring the state of the terminal device display (e.g. active/not active). The inference of the consumption level for the audio modality may be performed via identifying the state of the speakers of the terminal device or monitoring the vibrations created by the terminal device speakers when the audio is being played. The inference of the consumption level for the haptic modality may be performed via monitoring of the terminal device haptic feedback output (e.g. via motion sensors placed in the terminal device), identification of the haptic feedback actuators of the terminal device and identifying the state of the haptic actuators. The inference of the consumption level may be influenced by the current user activity and time of the day. As an example, a user in the morning may have a different behavior when consuming the message as in the evening and such behavior might have an impact on the consumption level. The inference of the consumption level may also be decided by the user where the user may select how much it has consumed the user content of the message.

In some aspects, the user content may have consumption requirements, where the consumption of the modalities cannot be made separately. Thus, according to an embodiment the at least two types of user content is associated with a joint required level of consumption such that the user content is considered not played out unless the played out amount of the user content fulfills the joint required level of consumption.

In other aspects, the consumption of user content of different modalities is allowed to be performed separately, where e.g., the haptic user content and the visual user content may be required to be played together, whilst simultaneously playing out the audio user content of the same message may not be necessary. Thus, according to an embodiment each of the at least two types of user content is associated with a required level of consumption such that the user content of one of the at least two types is considered not played out unless the played out amount of the user content for this one of the at least two types fulfills the required level of consumption for this one of the at least two types.

Such requirements may be imposed as thresholds on each of the consumption level variables H, V, A by introducing a required minimum consumption level, Lr(M)=[H, V, A] for the message M.

In some aspects, a notification remains active in all terminal devices when the consumption level L is lower than the minimum consumption level Lr, i.e., when L<Lr.

In some aspects, the notification is modified depending on the consumption of the user content. That is, according to an embodiment the terminal device 200a is configured to perform (optional) step S110:

S110: The terminal device 200a modifies the notification according to the amount of the user content that has been played out at the terminal device 200a. Alternatively, the terminal device 200a in step S100 generates a new notification according to the amount of the user content that has been played out at the terminal device 200a.

Examples of how the notification could be modified will be disclosed next.

In some aspects, the notification is deactivated in all terminal devices which cannot achieve the minimum consumption level requirement Lr, which occurs when the achievable consumption, denoted La, is lower than the minimum consumption level required for the message, i.e. La<Lr. In particular, according to an embodiment the user content is associated with a required level of consumption, and the notification is removed from the user interface if the terminal device 200a is not capable of playing out the user content to an amount such that the required level of consumption is fulfilled.

In some aspects, the notification remains active in all terminal devices if the consumption level L is lower than the minimum consumption level requirement Lr. That is, according to an embodiment the user content is associated with a required level of consumption, and the notification is left without modification only if the amount of the user content that has been played out is less than the required level of consumption.

The notification could remain active in all other terminal devices having received the same message.

In some aspects, when the notification remains active in a terminal device, the user content remains the same and is replayed to the user when the user accesses the message. That is, according to an embodiment the user content remains unchanged in the terminal device 200a and is played out from its beginning as long as the notification is not modified so as to be removed from the user interface.

In other aspects, when the notification remains active in a terminal device, the user content for which the consumption level has been larger than the minimum consumption level requirement, i.e. L(k)>Lr(k), for k∈[1, 3], the user content is modified to match the minimum consumption level requirement.

As an example, if for a message, audio is not required to be played out simultaneously with visual information and/or haptic information (e.g. Lr=[0.5, 0.5, 0]), then the audio component of the user content is removed to not be replayed. In another example, if only haptic feedback was not consumed (i.e. L=[0, V, A], for V>0 and A>0) and haptic feedback can be played out independently of video and audio (i.e. Lr=[1, 0, 0]), then the haptic component of the user content is played out whilst the visual user content and the audio user content of the message are disabled. Further, a variable P(M) could be introduced in order to define what can be played out independently and what needs to be played out according to the required consumption level (Lr). As an example, the variable P(M) could be implemented as a 3-by-3 matrix, where the rows and the columns represent each modality (H, V, A) and for a value of 1 it means that the row modality has to be played together with the column modality, and 0 otherwise. This enables the notion of consumption requirement level and the requirement of joint playout to be decoupled.

In other aspects, when the notification remains active in a terminal device, the user content is modified in duration. That is, according to an embodiment the message is modified such that user content that has been played out is deleted from the terminal device 200a. Additionally or alternatively, playing out the user content is resumed so as to skip already played out user content. As an example, if a message has duration T seconds and only the first Δt seconds of the user content has been played out, only any remaining message user content of length T−Δt seconds is to be replayed to the user.

In some aspects, user content for which the consumption level has been larger than the consumption level requirement is modified to match the consumption level requirement. That is, according to an embodiment the user content is associated with a required level of consumption, and the action involves the user content that has been played out only to be deleted from the terminal device 200a if the user content that has been played out fulfills the required level of consumption.

In some aspects, when a modality of the user content is disabled, the user content of the disabled modality may be removed from the terminal device in order to reduce memory utilization and to enable an easier replay of the user content. That is, according to an embodiment the message is modified such that user content that cannot be played out by the terminal device 200a is deleted from the terminal device 200a.

In some aspects, where each modality is experienced in a separate terminal device, a synchronization message could be sent when the consumption is to be initiated and when the consumption is finished/stopped/completed in order to display and evaluate the consumption levels of such message, considering all terminal devices.

That is, according to an embodiment the terminal device 200a only is capable of playing out the user content of less than all the at least two types, and the terminal device 200a is configured to perform (optional) step S112:

S112: The terminal device 200a provides, to the network controller 300 or another terminal device 200b, 200c having received the message, an indication when the terminal device 200a has played out the user content in those of the at least two types that the terminal device 200a is capable of playing out.

In some aspects the indication is provided on a direct link between the terminal device 200a and the terminal device 200b, 200c. In other aspects the indication is provided to the terminal device 200b, 200c via the network controller 300.

A message exchange between all terminal devices informing of the performed consumption could be required in order for each terminal device to determine which action to be performed according to the above aspects and embodiments (e.g. enabling/disabling playing out of user content of one or more modalities). Hence according to an embodiment the terminal device 200a is configured to perform (optional) step S114:

S114: The terminal device 200a obtains, from the network controller 300 or another terminal device 200b, 200c having received the message, an indication of which of the at least two types of user content the so-called another terminal device 200b, 200c has played out.

The terminal device 200 modifies the message accordingly. Particularly, according to this embodiment the terminal device 200a is configured to perform (optional) step S116:

S116: The terminal device 200a modifies the message according to the types of user content that has been played out at the so-called another terminal device 200b, 200c.

This could cause the notification provided to the user interface of the terminal device 200a in step S104 to be modified. Alternatively, this could cause a new notification to replace the previous notification. The modified, or new, notification would then reflect the types of user content that has not been played out at the so-called another terminal device 200b, 200c. That is, the indication obtained in step S114 could trigger generation of a notification to the user of the receiving terminal device 200b, 200c (as defined by the so-called another terminal device), at the receiving device 200b, 200c. Further, the indication could be a notification generated by the transmitting terminal device 200a (if the transmitting terminal device 200a is capable of generating notifications without needing to involve a network controller 300 (thus only using the network controller for distribution of the notification).

In some aspects the indication is obtained on a direct link between the terminal device 200a and the terminal device 200b, 200c. In other aspects the indication is obtained from the terminal device 200b, 200c via the network controller 300.

Likewise, in the same way as the terminal device 200a provides an indication to another terminal device 200b, 200c in step S112 of the terminal having played out the user content in less than all the modalities, the terminal device 200a could provide a corresponding indication to another terminal device 200b, 200c about the amount of played out user content. Particularly, according to an embodiment the terminal device 200a is configured to perform (optional) step S118:

S118: The terminal device 200a provides, to the network controller 300 or another terminal device 200b, 200c having received the message, an indication of the amount of the user content that has been played out (at the terminal device 200a).

In some aspects the indication is provided on a direct link between the terminal device 200a and the terminal device 200b, 200c. In other aspects the indication is provided to the terminal device 200b, 200c via the network controller 300.

Such an indication could also be obtained from another terminal device 200b, 200c. Particularly, according to an embodiment the terminal device 200a is configured to perform (optional) step S120:

S120: The terminal device 200a obtains, from the network controller 300 or another terminal device 200b, 200c having received the message, an indication of the amount of the user content that has been played out at said another terminal device 200b, 200c.

In some aspects the indication is obtained on a direct link between the terminal device 200a and the terminal device 200b, 200c. In other aspects the indication is obtained from the terminal device 200b, 200c via the network controller 300.

The terminal device 200a could then modify the message accordingly. That is, according to an embodiment the terminal device 200a is configured to perform (optional) step S122:

S122: The terminal device 200a modifies the message according to the amount of the user content that has been played out at the so-called another terminal device 200b, 200c.

This could cause the notification provided to the user interface of the terminal device 200a in step S104 to be modified. Alternatively, this could cause a new notification to replace the previous notification. The modified, or new, notification would then reflect the amount of the user content that has not been played out at the so-called another terminal device 200b, 200c.

Reference is now made to FIG. 3 illustrating a method for message handling in terminal devices 200a, 200b, 200c as performed by the network controller 300 according to an embodiment.

S202: The network controller 300 sends a message comprising user content to at least two terminal devices 200a, 200b, 200c.

It is assumed that at least one of the terminal devices 200a, 200b, 200c consumes at least part of the user content in accordance with any of the above embodiments and indicates this to the network controller 300. Hence the network controller 300 is configured to perform step S204:

S204: The network controller 300 receives, from at least one of the terminal devices 200a, 200b, 200c having received the message, an indication of the amount of the user content that has been played out at this at least one of the terminal devices 200a, 200b, 200c.

The network node 300 then informs any remaining terminal devices 200a, 200b, 200c, 200d having received the message about the consumption of the user content. Particularly, the network controller 300 is configured to perform step S206:

S206: The network controller 300 sends, to any remaining of the terminal devices 200a, 200b, 200c having received the message, an indication of the amount of the user content that has been played out at this at least one of the terminal devices 200a, 200b, 200c.

Embodiments relating to further details of message handling in terminal devices 200a, 200b, 200c as performed by the network controller 300 will now be disclosed.

In some aspects a local copy of the message is kept by the network controller 300. The local copy of the message could then be modified in accordance with the consumption of the user content. Particularly, according to an embodiment the network controller 300 holds a local copy of the message and is configured to perform (optional) step S208:

S208: The network controller 300 modifies the message according to the amount of the user content that has been played out at least one of the terminal devices 200a, 200b, 200c.

Thus, when the complete user content has been played out the network controller 300 could remove its local copy of the message.

As disclosed above, according to an embodiment the message comprises user content of at least two types. The network controller 300 could then be configured to perform step S210:

S210: The network controller 300 receives, from at least one of the terminal devices 200a, 200b, 200c having received the message, an indication of which of the at least two types of user content said at least one of the terminal devices 200a, 200b, 200c has played out.

An indication of this could be sent to any remaining of the terminal devices 200a, 200b, 200c. Thus, according to an embodiment the network controller 300 is configured to perform step S212:

S212: The network controller 300 sends to any remaining of the terminal devices 200a, 200b, 200c having received the message, an indication of which of the at least two types of user content said at least one of the terminal devices 200a, 200b, 200c has played out.

Consider that user A sends, from one terminal device, a message with visual and haptic content to user B, and that user B has several terminal devices where the message may be received (such as a smartphone, a smartwatch, and a laptop computer). Further, assume that the smartphone and the smartwatch are capable of playing out haptic user content, whilst the laptop computer is not.

In such a scenario, user B may consume the visual component on the laptop computer, but haptic user content cannot be played out on such the laptop computer. In this example it is assumed that, for the haptic content to be played out, a visual component must also be played out, whilst visual content may be played out by itself. Hence, whilst the user consumes the message by playing out the visual component in the laptop computer, a notification remains active in the other terminal devices with haptic feedback enabled, where the haptic user content can be played out together with the visual user content.

In another scenario, user B may not be able to properly consume the haptic user content on the smartphone (although the smartphone is capable of playing out the haptic user content) due to that the terminal device is placed on top of a surface instead of user B holding the terminal device with its hands. In such a scenario, the message notification remains active in the terminal device until the user properly consumes the user content.

Figure 4:
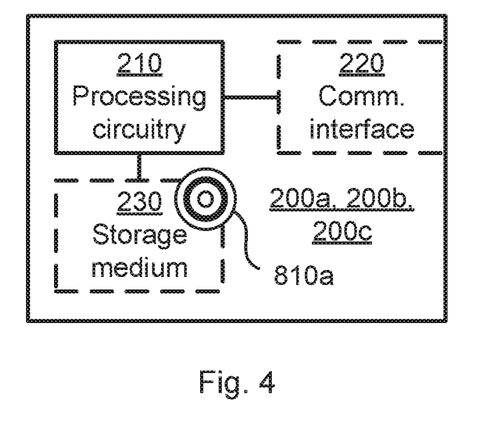
FIG. 4 is a schematic diagram showing functional units of a terminal device according to an embodiment.

FIG. 4 schematically illustrates, in terms of a number of functional units, the components of a terminal device 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810a (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the terminal device 200a to perform a set of operations, or steps, S102-S122, as disclosed above. For example, the storage medium 230 may store the set of operations, and the processing circuitry 210 may be configured to retrieve the set of operations from the storage medium 230 to cause the terminal device 200a to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The terminal device 200a may further comprise a communications interface 220 for communications with the network controller 300 and other terminal devices 200b, 200b. As such the communications interface 220 may comprise one or more transmitters and receivers, comprising analogue and digital components.

The processing circuitry 210 controls the general operation of the terminal device 200a e.g. by sending data and control signals to the communications interface 220 and the storage medium 230, by receiving data and reports from the communications interface 220, and by retrieving data and instructions from the storage medium 230. Other components, as well as the related functionality, of the terminal device 200a are omitted in order not to obscure the concepts presented herein.

Figure 5:
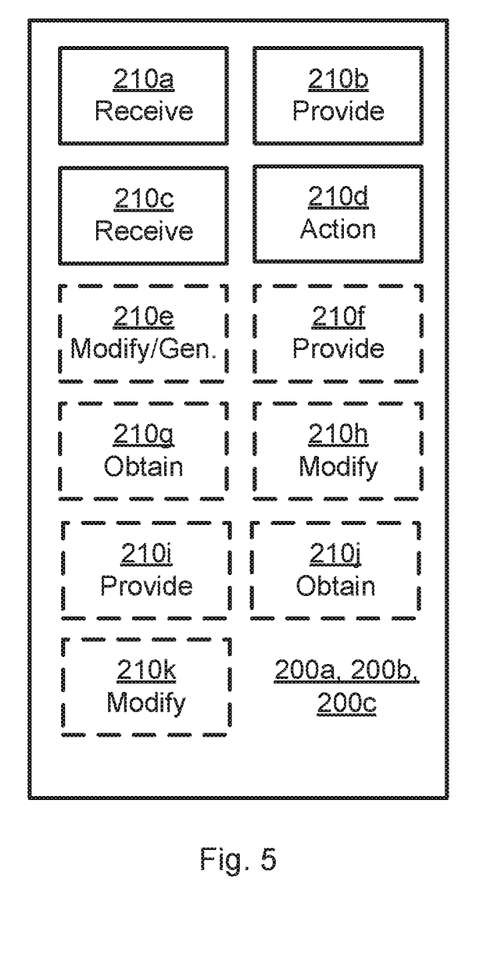
FIG. 5 is a schematic diagram showing functional modules of a terminal device according to an embodiment.

FIG. 5 schematically illustrates, in terms of a number of functional modules, the components of a terminal device 200a according to an embodiment. The terminal device 200a of FIG. 5 comprises a number of functional modules; a first receive module 210a configured to perform step S102, a first provide module 210b configured to perform step S104, a second receive module configured to perform step S106, and an action module 210d configured to perform step S108.

The terminal device 200a of FIG. 5 may further comprise a number of optional functional modules, such as any of a first modify module or generate module 210e configured to perform step S110, a second provide module 210f configured to perform step S112, a first obtain module 210g configured to perform step S114, a second modify module 210h configured to perform step S116, a third provide module 210i configured to perform step S118, a second obtain module 210j configured to perform step S120, and a third modify module 210k configured to perform step S122.

In general terms, each functional module 210a-210k may be implemented in hardware or in software. Preferably, one or more or all functional modules 210a-210k may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210k and to execute these instructions, thereby performing any steps of the terminal device 200a as disclosed herein.

Examples of terminal devices 200a have been disclosed above.

Figure 6:
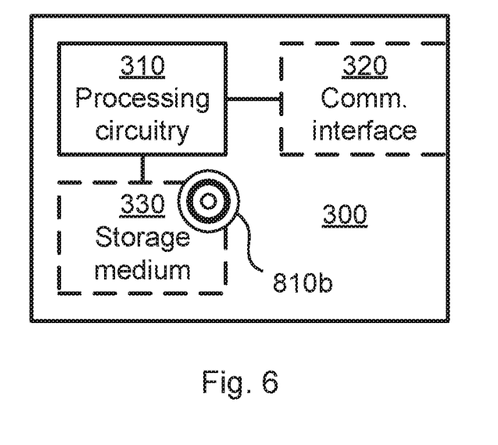
FIG. 6 is a schematic diagram showing functional units of a network controller according to an embodiment.

FIG. 6 schematically illustrates, in terms of a number of functional units, the components of a network controller 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 810b (as in FIG. 8), e.g. in the form of a storage medium 330. The processing circuitry 310 may further be provided as at least one application specific integrated circuit (ASIC), or field programmable gate array (FPGA).

Particularly, the processing circuitry 310 is configured to cause the network controller 300 to perform a set of operations, or steps, S202-S212, as disclosed above. For example, the storage medium 330 may store the set of operations, and the processing circuitry 310 may be configured to retrieve the set of operations from the storage medium 330 to cause the network controller 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The network controller 300 may further comprise a communications interface 320 for communications with the terminal devices 200a, 200b, 200c. As such the communications interface 320 may comprise one or more transmitters and receivers, comprising analogue and digital components.

The processing circuitry 310 controls the general operation of the network controller 300 e.g. by sending data and control signals to the communications interface 320 and the storage medium 330, by receiving data and reports from the communications interface 320, and by retrieving data and instructions from the storage medium 330. Other components, as well as the related functionality, of the network controller 300 are omitted in order not to obscure the concepts presented herein.

Figure 7:
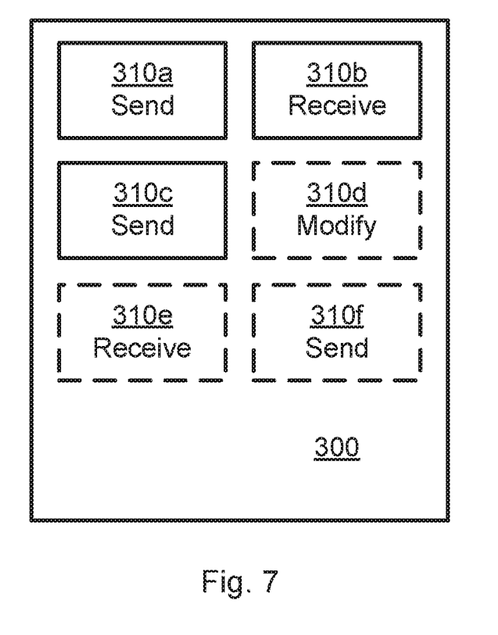
FIG. 7 is a schematic diagram showing functional modules of a network controller according to an embodiment.

FIG. 7 schematically illustrates, in terms of a number of functional modules, the components of a network controller 300 according to an embodiment. The network controller 300 of FIG. 7 comprises a number of functional modules; a first send module 310a configured to perform step S202, a first receive module 310b configured to perform step S204, and a second send module 310c configured to perform step S106. The network controller 300 of FIG. 7 may further comprise a number of optional functional modules, such as any of a modify module 310d configured to perform step S208, a second receive module 310e configured to perform step S210, and a third send module 310f configured to perform step S212.

In general terms, each functional module 310a-310d may be implemented in hardware or in software. Preferably, one or more or all functional modules 310a-310d may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310d and to execute these instructions, thereby performing any steps of the network controller 300 as disclosed herein.

The network controller 300 may be provided as a standalone device or as a part of at least one further device. For example, the network controller 300 may be provided in a node of a radio access network or in a node of a core network, or even in a node of a service network. Alternatively, functionality of the network controller 300 may be distributed between at least two devices, or nodes. These at least two nodes, or devices, may either be part of the same network part (such as the radio access network or the core network) or may be spread between at least two such network parts.

Thus, a first portion of the instructions performed by the network controller 300 may be executed in a first device, and a second portion of the of the instructions performed by the network controller 300 may be executed in a second device; the herein disclosed embodiments are not limited to any particular number of devices on which the instructions performed by the network controller 300 may be executed. Hence, the methods according to the herein disclosed embodiments are suitable to be performed by a network controller 300 residing in a cloud computational environment. Therefore, although a single processing circuitry 310 is illustrated in FIG. 6 the processing circuitry 310 may be distributed among a plurality of devices, or nodes. The same applies to the functional modules 310a-310f of FIG. 7 and the computer program 820b of FIG. 8 (see below).

Figure 8:
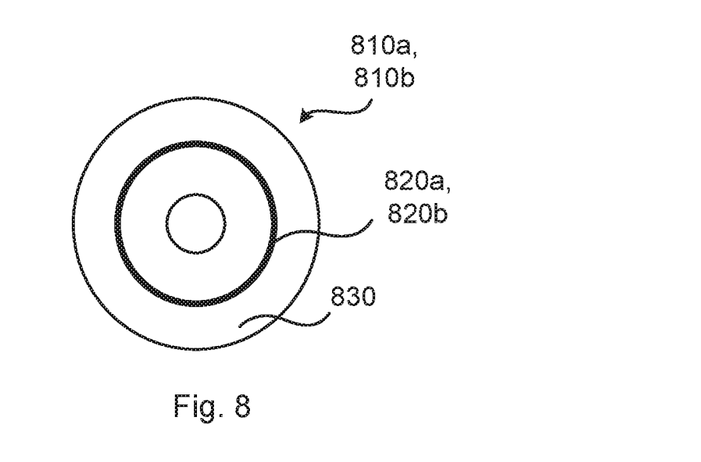
FIG. 8 shows one example of a computer program product comprising computer readable means according to an embodiment.

FIG. 8 shows one example of a computer program product 810a, 810b comprising computer readable means 830. On this computer readable means 830, a computer program 820a can be stored, which computer program 820a can cause the processing circuitry 210 and thereto operatively coupled entities and devices, such as the communications interface 220 and the storage medium 230, to execute methods according to embodiments described herein. The computer program 820a and/or computer program product 810a may thus provide means for performing any steps of the terminal device 200a as herein disclosed. On this computer readable means 830, a computer program 820b can be stored, which computer program 820b can cause the processing circuitry 310 and thereto operatively coupled entities and devices, such as the communications interface 320 and the storage medium 330, to execute methods according to embodiments described herein. The computer program 820b and/or computer program product 810b may thus provide means for performing any steps of the network controller 300 as herein disclosed.

In the example of FIG. 8, the computer program product 810a, 810b is illustrated as an optical disc, such as a CD (compact disc) or a DVD (digital versatile disc) or a Blu-Ray disc. The computer program product 810a, 810b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820a, 820b is here schematically shown as a track on the depicted optical disk, the computer program 820a, 820b can be stored in any way which is suitable for the computer program product 810a, 810b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method of operating a terminal device in a communication network for message handling, the method comprising:

receiving, from a network controller operating in the communication network, a message comprising user content;

responsive to receiving the message, storing the user content in the terminal device;

providing a notification of the message to a user interface of the terminal device;

receiving feedback from the user interface, the feedback indicating a portion of the user content that has been played out at the user interface;

responsive to receiving the feedback from the user interface, determining that an amount of the portion of the user content that has been played out at the user interface exceeds a predetermined threshold value; and responsive to the amount of the portion of the user content that has been played out exceeding the predetermined threshold value, deleting a second portion of the user content from the terminal device, the second portion being based on the portion of the user content that has been played out.

2. The method of claim 1, wherein the user content comprising at least two of: text content, audio content, haptic content, and olfactory content.

3. The method of claim 2, wherein the at least two types of user content are associated with a joint required level of consumption such that the user content is considered not played out unless the played out amount of the user content fulfills the joint required level of consumption.

4. The method of claim 2, wherein each of the at least two types of user content are associated with a required level of consumption such that the user content of one of the at least two types is considered not played out unless the played out amount of the user content for the one of the at least two types fulfills the required level of consumption for the one of the at least two types.

5. The method of claim 2, wherein the terminal device only is capable of playing out the user content of less than all the at least two types, the method further comprising:

providing, to the network controller or a second terminal device having received the message, an indication when the terminal device has played out the user content in those of the at least two types that the terminal device is capable of playing out.

6. The method of claim 5, wherein the indication is provided to the second terminal device via the network controller.

7. The method of claim 2, further comprising:

obtaining, from the network controller or a second terminal device having received the message, an indication of which of the at least two types of user content the second terminal device has played out; and modifying the message according to the types of user content that has been played out at the second terminal device.

8. The method of claim 7, wherein the indication is obtained from the second terminal device via the network controller.

9. The method of claim 1, further comprising:

responsive to receiving the message, determining that the user interface is capable of playing out the user content, wherein storing the user content in the terminal device comprises storing the user content in the terminal device in response to determining that the user interface is capable of playing out the user content.

10. The method of claim 1, wherein the notification indicates a type of the user content.

11. The method of claim 1, further comprising:

responsive to deleting the second portion, determining that the user interface is incapable of playing out any remaining user content of the message, instructing the user interface to remove the notification from the user interface.

12. The method of claim 1, wherein the user content is associated with a required level of consumption, and wherein the notification is removed from the user interface of the terminal device if the terminal device is incapable of playing out an amount of the user content that is less than the required level of consumption.

13. The method of claim 1, wherein the notification, when the user interface is incapable of playing out the user content, indicates that the user interface is incapable of playing out any remaining user content of the message.

14. The method of claim 1, further comprising:

responsive to determining the portion of the user content that has been played out at the user interface, providing a new notification to the user interface based on the amount of the user content that has been played out at the terminal device.

15. The method of claim 1, wherein the user content is associated with a required level of consumption, and wherein the notification is modified so as to be removed from the user interface if the terminal device is not capable of playing out the user content to an amount such that the required level of consumption would be fulfilled.

16. The method of claim 1, wherein the user content is associated with a required level of consumption, and wherein the notification is left without modification only if the amount of the user content that has been played out is less than the required level of consumption.

17. The method of claim 1, wherein the user content remains unchanged in the terminal device and is played out from its beginning as long as the notification is not modified so as to be removed from the user interface.

18. The method of claim 1, further comprising:

providing, to the network controller or a second terminal device having received the message, an indication of at least one of the amount of the user content that has been played out, when in time the user content was played out, and, when the message comprises user content of at least two types, for which of the at least two types the user content was played out.

19. The method of claim 1, further comprising:

obtaining, from the network controller or a second terminal device having received the message, an indication of the amount of the user content that has been played out at the another terminal device; and modifying the message according to the amount of the user content that has been played out at the second terminal device.

20. The method of claim 19, wherein the indication is obtained from the second terminal device via the network controller.

21. The method of claim 1, wherein the user content is text and the user interface is a visual user interface and the feedback indicates how much of the text that has been displayed on the visual user interface.

22. The method of claim 1, wherein the user content is audio and the user interface is an audio user interface and the feedback indicates how much of the audio that has been played out by the audio user interface.

23. The method of claim 1, wherein the user content is haptic and the user interface comprises motion sensors and the feedback indicates how much the motion sensors have been activated when playing out the message.

24. The method of claim 1, wherein the user content is olfactory and the user interface comprises an olfactory sensor and the feedback indicates how much the olfactory sensor has been activated when playing out the message.

25. The method of claim 1, further comprising responsive to receiving the message, determining the portion of the user content that the user interface is capable of playing out,
wherein storing the user content in the terminal device comprises only storing the portion of the user content that the user interface is capable of playing out.

26. The method of claim 1, wherein the second portion of the user content comprises all of the user content in the message.

27. A method of operating a network controller in a communications network for message handling in terminal devices, the method comprising:
sending a message comprising user content to at least two terminal devices;
receiving, from a first terminal device of the at least two terminal devices, an indication of a portion of the user content that has been played out at the first terminal device;
responsive to receiving the indication of the portion of the user content that has been played out at the first terminal device, determining that an amount of the portion exceeds a predetermined threshold value; and
responsive to determining that the amount of the portion of the user content that has been played out at the first terminal device exceeds the predetermined threshold value, sending, to a second terminal device of the at least two terminal devices, an indication to delete a second portion of the user content from the second terminal device, the second portion being based on the portion of the user content that has been played out at the first terminal device.

28. The method of claim 27, wherein the network controller holds a local copy of the message, the method further comprising:
modifying the message based on the portion of the user content that has been played out at least one of the terminal devices.

29. The method of claim 27, wherein the message comprises user content of at least two types, wherein the at least two types is selected from a group comprising text content, audio content, haptic content, and olfactory content.

30. The method of claim 28, further comprising:
receiving, from at least one of the terminal devices having received the message, an indication of which of the at least two types of user content the one of the terminal devices has played out;
sending to any remaining of the terminal devices having received the message, an indication of which of the at least two types of user content the one of the terminal devices has played out.

31. A terminal device operating in a communication network for message handling, the terminal device comprising:
processing circuitry; and
a non-transitory storage medium storing instructions that, when executed by the processing circuitry, cause the terminal device to perform operations, the operations comprising:
receiving, from a network controller operating in the communication network, a message comprising user content;
providing a notification of the message to a user interface of the terminal device;
receiving feedback from the user interface, the feedback indicating a portion of the user content that has been played out at the user interface; and
responsive to receiving the feedback from the user interface, determining that an amount of the portion of the user content that has been played out at the user interface exceeds a predetermined threshold value; and
responsive to the amount of the portion of the user content that has been played out exceeding the predetermined threshold value, deleting a second portion of the user content from the terminal device, the second portion being based on the portion of the user content that has been played out.

32. A network controller operating in a communications network for message handling in a terminal device, the network controller comprising:
processing circuitry; and
a non-transitory storage medium storing instructions that, when executed by the processing circuitry, cause the network controller to perform operations, the operations comprising:
sending a message comprising user content to at least two terminal devices;
receiving, from a first terminal device of the at least two terminal devices, an indication of a portion of the user content that has been played out at the first terminal device;
responsive to receiving the indication of the portion of the user content that has been played out at the first terminal device, determining that an amount of the portion exceeds a predetermined threshold value; and
responsive to determining that the amount of the portion of the user content that has been played out at the first terminal device exceeds the predetermined threshold value, sending to a second terminal device of the at least two terminal devices, an indication to delete a second portion of the user content from the second terminal device, the second portion being based on the portion of the user content that has been played out at the first terminal device.

33. A computer program product for message handling in a terminal device, the computer program product comprising a non-transitory computer readable medium storing computer code which, when run on processing circuitry of the terminal device, causes the terminal device to perform operations, the operations comprising:
receiving, from a network controller operating in the communication network, a message comprising user content;
providing a notification of the message to a user interface of the terminal device;
receiving feedback from the user interface, the feedback indicating a portion of the user content that has been played out at the user interface; and
responsive to receiving the feedback from the user interface, determining that an amount of the portion of the user content that has been played out at the user interface exceeds a predetermined threshold value; and
responsive to the amount of the portion of the user content that has been played out exceeding the predetermined threshold value, deleting a second portion of the user content from the terminal device, the second portion being based on the portion of the user content that has been played out.

* * * * *